United States Patent Office 3,471,554
Patented Oct. 7, 1969

3,471,554
DERIVATIVES OF BISPHENOLIC SUBSTITUTED CARBOXYLIC ACIDS
Reynold E. Holmen, White Bear Lake, Minn., assignor to Minnesota Mining & Manufacturing Company, St. Paul, Minn., a corporation of Delaware
No Drawing. Original application Apr. 20, 1955, Ser. No. 502,742, now Patent No. 3,382,252, dated May 7, 1968. Divided and this application Sept. 8, 1967, Ser. No. 666,511
Int. Cl. C07c *65/14;* C08f *27/18*
U.S. Cl. 260—520                                      3 Claims

ABSTRACT OF THE DISCLOSURE

Dicarboxylic, diphenolic compound obtained by condensing one mol of an organodihalide with two mols of bis-phenolic acid. Polyfunctional materials react with the two carboxyl groups to yield linear polymers, and the phenolic groups may be cross-linked using formaldehyde.

This application is a division of applicant's copending application Ser. No. 502,742, filed Apr. 20, 1955, now U.S. Patent 3,382,252. A division of said application has issued as U.S. Patent No. 2,984,685.

This invention relates to a new and highly useful class of bisphenol (bisphenolic) compounds containing phenolic radicals and additional functional groups providing for increased reactivity and other valuable properties. The invention also relates to novel resinous and other products prepared from such compounds. A specific compound from which many of the compounds of the present invention may be derived is gamma, gamma-bis(4-hydroxyphenyl)valeric acid. That particular compound is the central feature of Bader U.S. Patent No. 2,933,520 and is there sometimes designated 4,4-bis(4-hydroxyphenyl) pentanoic acid.

Gamma,gamma-bis(4-hydroxyphenyl)valeric acid and analogous bisphenolic compounds are readily produced by reaction, in the presence of a mineral acid catalyst, between (1) a phenol and (2) an oxocarboxylic or keto acid or ester in which a keto group is connected to a carboxy or carboalkoxy radical through an alkylene radical of at least two carbon atoms. Such keto compounds are readily available and are highly stable both under acid conditions and at elevated temperature whether in the form of the carboxylic acid or the ester. Levulinic acid is a preferred example and, since this compound is readily available, it or one of its alkyl esters is employed in the exemplary but non-limitative formulas and procedures hereinbelow set forth.

The intermediate alkylene radical of the keto acid or ester may be either a polymethylene radical such as a propylene or preferably an ethylene radical, or may be an alkyl-substituted polymethylene radical such as an ethyl ethylene radical. Compounds of the latter type, viz., alpha-alkyl-gamma-oxocarboxylic acids, are readily prepared from alpha-halogen aliphatic acids and sodium aceto-acetic esters or acetylacetonates.

Preparation of γ,γ-bis(4-hydroxyphenyl)valeric acid

|                              | G.   |
|------------------------------|------|
| Phenol (0.2 mol)             | 18.8 |
| Levulinic acid (0.05 mol)    | 5.8  |
| Calcium chloride             | 7.0  |
| Conc. hydrochloric acid      | 0.17 |
| Mercaptoacetic acid          | 0.06 |

The phenol was dissolved in the levulinic acid to which was added the calcium chloride, hydrochloric acid and mercaptoacetic acid. Solution was hastened by slight warming. After ten days at room temperature, the viscous reaction mixture was poured into water, dissolved in ether and extracted with dilute aqueous sodium bicarbonate. Acidification of the combined bicarbonate extracts yielded a viscous water insoluble resin. This was dissolved in ether; some ethanol and benzene were added; and the solution was evaporated to dryness in a current of air, with heating. The pale amber solid resinous product was identified as γ,γ-bis(4-hydroxyphenyl)valeric acid having the following formula:

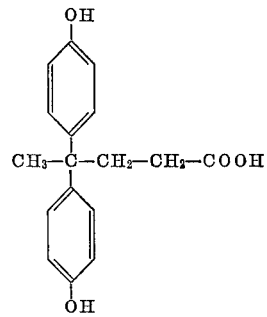

*Analysis.*—Calculated for $C_{17}H_{18}O_4$: C, 71.3; H, 6.3. Found: C, 71.1; H, 6.4.

The glassy form of this compound melts under 100° C., but, from solution, crystalline forms can be obtained either with solvent of crystallization or without, the solvated forms usually being obtained at room temperature. The solvated forms, when heated rapidly melted considerably lower than the anhydrous form which melted at 173–174° C. By slow cautious heating of the solvated forms, it was often possible to drive off the solvent at a lower temperature without concurrent melting. Crystals deposited from solution in a mixed solvent such as ethyl acetate-carbon tetrachloride often exhibited two unsharp melting points, each followed by resolidification.

It should be noted that a considerable excess of phenol was used, mostly because of the favorable effect on the reaction and the ease with which phenol can be removed from the condensation product. However, it is unnecessary that the phenol be present in excess; and, in fact, an excess of the levulinic acid could be used, if preferred.

Considerable latitude is permissible in the composition of the mixture from which γ,γ-bis(hydroxyphenyl)valeric acid is obtained, both as to choice of reactive agents and as to amounts.

The condensation of phenols with levulinic acid to give the γ,γ-bisphenolic substituted valeric acids of this invention was also carried out using as catalyst aqueous hydrochloric acid of concentrations varying from 37% (ordinary concentrated hydrochloric acid) down to about 8%. In these instances the quantities of concentrated hydrochloric acid used in the reaction mixture approximated the weight of levulinic acid used, and the reactions were run at reflux temperature (about 93°–108° C.) for 20–24 hour periods.

Alternatively, sulfuric acid catalyst (of 80% or lower concentration) was also employed at room temperature. Shorter reaction times are often possible with sulfuric acid, but hydrochloric acid is more conveniently removed after completion of the reaction.

Preparation of γ,γ-bis(4-hydroxy-3-methylphenyl) valeric acid

To freshly distilled o-cresol (216.3 grams) was added 58 grams levulinic acid and 2 grams mercaptoacetic acid. The solution was stirred and saturated with dry hydrochloric acid intermittently for two days and allowed to stand at room temperature for a total of seven days. Unreacted starting materials, water and the hydrochloric acid were distilled off under vacuum up to 150° C. at 2 mm. Hg. A residue weighing about 136 grams remained. To the hot residue was added, with stirring, about 100 ml. of xylene and 30 ml. of ethyl acetate. A fine mush separated as the mixture cooled. A first crop of 61 grams of pale powdery product (M.P. 143–145° C.) was collected on a filter (washed with xylene-ethyl acetate, 20:6 by volume). The filtrate was extracted with aqueous sodium bicarbonate and from this extract an additional 47 grams of product was recovered. A sample, recrystallized from methanol-water and dried to 130° C. in a vacuum, was analyzed and found to be γ,γ - bis(4 - hydroxy - 3 - methylphenyl)valeric acid. The melting point of the sample was 144–146° C.

*Analysis.*—Calculated for $C_{19}H_{22}O_4$: C, 72.6; H, 7.0. Found: C, 72.4; H, 7.1.

This compound also readily forms lower melting crystals with solvent of crystallization.

Mercaptoacetic acid is one of a number of sulfur compounds which may be utilized to speed up the reaction of a phenol with the oxocarboxylic acids of this invention. Other compounds with which it may be replaced include hydrogen sulfide and mercaptopropionic acid. In fact, the reaction will proceed without the use of auxiliary catalysts but at a slower rate.

Preparation of ethyl ester of γ,γ-bis(4-hydroxyphenyl) valeric acid

A solution of ethyl levulinate (36.05 grams), phenol (94 grams) and mercaptoacetic acid (5 drops) in absolute ethanol (46 grams) was saturated with dry hydrochloric acid. After this had stood about 36 hours at room temperature, a 7.5-gram sample was withdrawn and distilled under vacuum up to a bath temperature of 150° C. at 0.3 mm. Hg. The solid residue was dissolved in ethanol. Some water was added and the solvent slowly evaporated from the solution. The ethyl ester of γ,γ-bis(4 - hydroxyphenyl)valeric acid crystallized in stubby colorless prisms (M.P. 126–128° C.). Similar treatment of the balance of the reaction mixture several days after resaturating with dry hydrochloric acid gave a total yield of 30 grams more of the ethyl ester. Another sample was crystallized from ethyl acetate-petroleum ether and melted at 127.5–128.5° C.

*Analysis.*—Calculated for $C_{19}H_{22}O_4$: C, 72.6; H, 7.0. Found: C, 72.4; H, 7.1.

The esters of these bisphenolic substituted derivatives of valeric acid may either be prepared directly from the levulinic ester as described above, or the condensation product of the phenol and levulinic acid may be subsequently esterified.

A number of other phenols including 2,6 - dimethylphenol, 2,6 - diethylphenol, 2,6 - diisopropylphenol, and o - phenylphenol have been found to react with the described oxoacids to give bisphenolic acids. Orthochlorophenol and 2,6 - di - t - butylphenol are also found to react, but less readily.

The bisphenolic acid and products obtained therefrom may be utilized in a variety of ways such as for antioxidants, germicides and fungicides, agricultural chemicals (growth regulators), plasticizers, lubricants, low adhesion backsizes, coupling agents, casting and molding resins and as intermediates in the production of polyfunctional epoxy compounds and internally plasticized phenol-aldehyde resins. The compounds of this invention are also valuable intermediates for the preparation of paper and textile treating materials. The initial condensates with formaldehyde as well as derivatives of the carboxyl function provide points of attachment to the fiber. Halogenation and nitration of products of this invention may be carried out to enhance certain types of activity such as fungicidal, bactericidal and herbicidal functions.

Example

One mol of a dihalogenated compound such as β,β'-dichlorodiethyl ether may be condensed in the presence of excess aqueous alkali with two mols of a bisphenolic substituted carboxylic acid to give a product typified by the following formula, as one example:

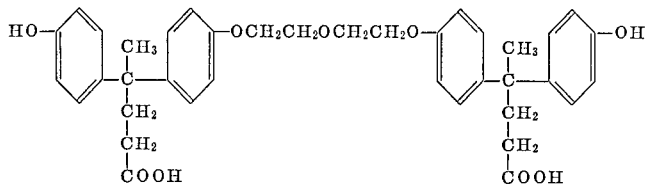

This dicarboxylic acid may be reacted with diols, diamines, diisocyanates, or aminoalcohols to give linear polymers having side group substituents at intervals. Controlled crosslinking can be carried out through the reactive phenolic side group and formaldehyde. This dicarboxylic acid and products obtained therefrom offer considerable promise as plasticizers, antioxidants, and lubricants and may prove to combine two or more of these properties into a single compound. A higher ratio of dihaloether to bisphenolic acid would give polymers directly.

It should also be noted that the aromatic rings of the bisphenolic acids and compounds obtainable therefrom may be reduced catalytically to give the cycloaliphatic analogs thereof.

What is claimed is:

1. A bisphenolic compound having the structural formula

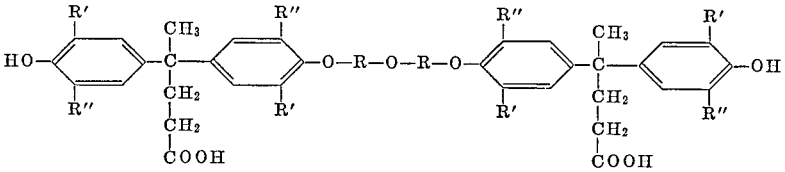

wherein R is an alkylene radical having at least two carbon atoms and R' and R" are each selected from the group consisting of hydrogen and alkyl radicals of 1–3 carbon atoms.

2. A bisphenolic compound as defined in claim 1 wherein R' and R" are each hydrogen.

3. A bisphenolic compound as defined in claim 2 wherein R is —$CH_2$—$CH_2$—.

References Cited

UNITED STATES PATENTS 2,933,520  4/1960  Bader _____ 260—473

LORRAINE A. WEINBERGER, Primary Examiner

D. STENZEL, Assistant Examiner

U.S. Cl. X.R.

260—47, 51, 51.5, 52, 999